(12) United States Patent
Deliwala (10) Patent No.: US 11,788,942 B2
(45) Date of Patent: Oct. 17, 2023

(54) COMPACT OPTICAL SMOKE DETECTOR SYSTEM AND APPARATUS

(71) Applicant: Analog Devices, Inc., Norwood, MA (US)

(72) Inventor: Shrenik Deliwala, Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 226 days.

(21) Appl. No.: 16/181,878

(22) Filed: Nov. 6, 2018

(65) Prior Publication Data

US 2019/0187037 A1 Jun. 20, 2019

Related U.S. Application Data

(60) Provisional application No. 62/599,474, filed on Dec. 15, 2017.

(51) Int. Cl.
| | |
|---|---|
| *G01N 15/06* | (2006.01) |
| *G08B 17/107* | (2006.01) |
| *G08B 17/113* | (2006.01) |
| *G01N 15/00* | (2006.01) |

(52) U.S. Cl.
CPC .......... *G01N 15/06* (2013.01); *G08B 17/107* (2013.01); *G08B 17/113* (2013.01); *G01N 2015/0046* (2013.01); *G01N 2015/0693* (2013.01)

(58) Field of Classification Search
CPC ........... G01N 15/06; G01N 2015/0693; G01N 2015/0046; G08B 17/107; G08B 17/103; G08B 17/113
USPC ........................................................ 356/343
See application file for complete search history.

(56) References Cited

U.S. PATENT DOCUMENTS

| | | |
|---|---|---|
| D225,380 S | 12/1972 | Sanger et al. |
| D238,154 S | 12/1975 | Tipton et al. |
| 4,075,614 A | 2/1978 | White |
| 4,181,439 A | 1/1980 | Tresch |
| 4,216,377 A | 8/1980 | Hasegawa et al. |
| 4,238,679 A | 12/1980 | Macmillan |
| 4,306,230 A | 12/1981 | Forss et al. |

(Continued)

FOREIGN PATENT DOCUMENTS

| | | |
|---|---|---|
| AT | 502655 B1 | 5/2007 |
| CN | 205786299 U | 12/2016 |

(Continued)

OTHER PUBLICATIONS

Non-Final Office Action dated May 19, 2021 in U.S. Appl. No. 16/825,339, 40 pages.

(Continued)

*Primary Examiner* — Sunghee Y Gray
(74) *Attorney, Agent, or Firm* — ArentFox Schiff LLP (57) ABSTRACT

Device for optically detecting smoke and implementing thereof. Apparatus and methods for detecting the presence of smoke in a small, long-lasting smoke detector are disclosed. Specifically, the present disclosure shows how to build a very compact housing around the smoke detector while keeping the reflections from the housing structure to a very low value while satisfying all the other peripheral needs of fast response to smoke and preventing ambient light. This allows very small measurements of light scattering of the smoke particles to be reliable in a device resistant to the negative effects of dust.

12 Claims, 9 Drawing Sheets

(56) References Cited

U.S. PATENT DOCUMENTS

| | | |
|---|---|---|
| D269,161 S | 5/1983 | Fenne |
| 4,430,646 A | 2/1984 | Enemark |
| RE32,105 E | 4/1986 | Enemark |
| D283,989 S | 5/1986 | Chen |
| D284,272 S | 6/1986 | Chen |
| 4,728,801 A | 3/1988 | O'Connor |
| D297,318 S | 8/1988 | Taylor |
| 4,857,895 A | 8/1989 | Kaprelian |
| 4,906,978 A | 3/1990 | Best et al. |
| D328,875 S | 8/1992 | Perkins |
| 5,351,034 A | 9/1994 | Berger et al. |
| 5,381,130 A | 1/1995 | Thuillard et al. |
| 5,400,014 A | 3/1995 | Behkle et al. |
| 5,420,440 A | 5/1995 | Ketler |
| 5,451,931 A | 9/1995 | Muller et al. |
| 5,497,144 A | 3/1996 | Schappi et al. |
| D382,217 S | 8/1997 | Akiyama et al. |
| D407,033 S | 3/1999 | Fors |
| 5,973,326 A | 10/1999 | Parry et al. |
| D434,686 S | 12/2000 | Denman |
| 6,225,910 B1 | 11/2001 | Kadwell et al. |
| 6,396,405 B1 | 5/2002 | Bernal et al. |
| 6,476,910 B1 | 11/2002 | Hermes |
| 6,521,907 B1 | 2/2003 | Shoaff et al. |
| 6,756,905 B2 | 6/2004 | Rattman |
| 7,248,173 B2 | 7/2007 | Yamasaki et al. |
| 7,806,085 B1 | 10/2010 | Waddy |
| D653,576 S | 2/2012 | Thalhammer |
| D653,577 S | 2/2012 | Thalhammer |
| D653,578 S | 2/2012 | Thalhammer |
| D665,289 S | 8/2012 | Thalhammer |
| 8,970,387 B2 | 3/2015 | Brigham et al. |
| 9,013,317 B2 | 4/2015 | Brigham et al. |
| 9,164,735 B2 | 10/2015 | Hux et al. |
| 9,196,141 B1 | 11/2015 | Schmidt et al. |
| D769,756 S | 10/2016 | Hojmose |
| 9,459,208 B2 | 10/2016 | Orsini et al. |
| 9,824,564 B2 | 11/2017 | Bressanutti et al. |
| D874,964 S | 2/2020 | Bai et al. |
| 10,674,711 B2 | 6/2020 | Hutton |
| 2001/0038338 A1 | 11/2001 | Kadwell et al. |
| 2002/0089426 A1 | 6/2002 | Qualey et al. |
| 2002/0084907 A1 | 7/2002 | Rattmann et al. |
| 2003/0058117 A1 | 3/2003 | Mayusumi et al. |
| 2004/0063154 A1 | 4/2004 | Booth et al. |
| 2004/0188598 A1* | 9/2004 | Kawai .................. G01N 21/53 250/222.2 |
| 2005/0173638 A1 | 8/2005 | Powell |
| 2007/0221848 A1 | 9/2007 | Johnson et al. |
| 2007/0242269 A1 | 10/2007 | Trainer |
| 2008/0246623 A1 | 10/2008 | Nagashima |
| 2008/0258903 A1* | 10/2008 | Le ..................... G08B 13/19602 340/506 |
| 2008/0266558 A1 | 10/2008 | Hess et al. |
| 2008/0316489 A1 | 12/2008 | Ludwig |
| 2012/0140231 A1 | 6/2012 | Knox |
| 2012/0267532 A1 | 10/2012 | Udrea et al. |
| 2013/0008787 A1 | 1/2013 | Mammoto et al. |
| 2013/0071290 A1 | 3/2013 | Goldstein et al. |
| 2014/0070101 A1 | 3/2014 | Matsushima et al. |
| 2015/0129767 A1 | 5/2015 | Kouznetsov et al. |
| 2015/0219491 A1 | 8/2015 | Lee et al. |
| 2015/0300938 A1* | 10/2015 | Debreczeny ........... G01N 21/51 356/343 |
| 2015/0377711 A1* | 12/2015 | Steffanson ................ G01J 5/40 250/349 |
| 2016/0033307 A1* | 2/2016 | Yanobe .................... G01C 3/02 356/6 |
| 2016/0153905 A1 | 6/2016 | Allemann et al. |
| 2017/0046935 A1* | 2/2017 | Allemann ............ G08B 17/103 |
| 2017/0169682 A1* | 6/2017 | Bressanutti .......... G08B 17/107 |
| 2017/0241904 A1 | 8/2017 | Barritault et al. |
| 2018/0348121 A1 | 12/2018 | Deliwala |
| 2018/0365955 A1* | 12/2018 | Bajaj ..................... G08B 29/188 |
| 2020/0209158 A1 | 7/2020 | Nikolaenko |

FOREIGN PATENT DOCUMENTS

| | | |
|---|---|---|
| CN | 206441309 U | 8/2017 |
| DE | 102010031139 A1 | 1/2012 |
| DE | 202015000820 U1 | 3/2015 |
| EP | 2492882 A1 | 8/2012 |
| EP | 3270362 A1 | 1/2018 |
| GB | 2000282 A | 1/1979 |
| GB | 2270157 A | 3/1994 |
| JP | D1410148 | 3/2014 |
| KR | 200421772 Y1 | 7/2006 |
| WO | 01/95279 A1 | 12/2001 |
| WO | 2016/150613 A1 | 9/2016 |
| WO | 2016/186884 A1 | 11/2016 |
| WO | 2017/021217 A1 | 2/2017 |

OTHER PUBLICATIONS

English Abstract of EP2492882A1, 1 page.
Office Action in KR1020180160083, dated May 25, 2023, 5 pages.
Office Action in KR1020210087031, dated May 25, 2023, 5 pages.
Office Action in KR1020210087055, dated May 25, 2023, 5 pages.
First Office Action in EP22162254.1, dated May 19, 2023, 7 pages.
Arecchi et al., "Light Emitting Diodes (LEDs)," Field Guide to Illumination, Jan. 1, 2007, 2 pages.

* cited by examiner

COMPACT OPTICAL SMOKE DETECTOR SYSTEM AND APPARATUS

CROSS-REFERENCE TO RELATED APPLICATIONS

This application is related and claims priority to U.S. Provisional Application No. 62/599,474 entitled, "COMPACT OPTICAL SMOKE DETECTOR SYSTEM AND APPARATUS" filed on Dec. 15, 2017, which is hereby incorporated by reference in its entirety.

FIELD OF THE DISCLOSURE

The present disclosure relates to smoke detection. More specifically, this disclosure describes apparatus and techniques relating to the optically identification of smoke within a compact and robust detector.

BACKGROUND

A smoke detector is a device that senses smoke, typically as an indicator of fire. Commercial security devices issue a signal to a fire alarm control panel as part of a fire alarm system, while household smoke detectors, also known as smoke alarms, generally issue a local audible or visual alarm from the detector itself.

Smoke detectors are housed in plastic enclosures, typically shaped like a disk about 150 millimeters (6 in) in diameter and 25 millimeters (1 in) thick, but shape and size vary. Smoke can be detected either optically (photoelectric) or by physical process (ionization), detectors may use either, or both, methods. Sensitive alarms can be used to detect, and thus deter, smoking in areas where it is banned. Smoke detectors in large commercial, industrial, and residential buildings are usually powered by a central fire alarm system, which is powered by the building power with a battery backup.

Domestic smoke detectors range from individual battery-powered units, to several interlinked mains-powered units with battery backup; with these interlinked units, if any unit detects smoke, all trigger even if household power has gone out. Optical smoke detectors tend to be larger in size. And consequently, 90% of domestic smoke detectors using ionization technology.

While ionization smoke alarms are generally more responsive to flaming fires, photoelectric smoke alarms are generally more responsive to fires that begin with a long period of smoldering (called "smoldering fires"). For each type of smoke alarm, the advantage it provides may be critical to life safety in some fire situations. Home fatal fires, day or night, include a large number of smoldering fires and a large number of flaming fires. One cannot predict the type of fire one may have in a home or when it will occur. Any smoke alarm technology, to be acceptable, must perform acceptably for both types of fires in order to provide early warning of fire at all times of the day or night and whether one is asleep or awake.

An ionization smoke detector uses a radioisotope, typically americium-241, to ionize air; a difference due to smoke is detected and an alarm is generated. The smoke detector has two ionization chambers, one open to the air, and a reference chamber which does not allow the entry of particles. The radioactive source emits alpha particles into both chambers, which ionizes some air molecules.

There is a potential difference (voltage) between pairs of electrodes in the chambers; the electrical charge on the ions allows an electric current to flow. The currents in both chambers should be the same as they are equally affected by air pressure, temperature, and the ageing of the source. If any smoke particles enter the open chamber, some of the ions will attach to the particles and not be available to carry the current in that chamber. An electronic circuit detects that a current difference has developed between the open and sealed chambers, and sounds the alarm.

A photoelectric, or optical smoke detector contains a source of infrared, visible, or ultraviolet light (typically an incandescent light bulb or light-emitting diode), a lens, and a photoelectric receiver (typically a photodiode). In spot-type detectors all of these components are arranged inside a chamber where air, which may contain smoke from a nearby fire, flows. In large open areas such as atria and auditoriums, optical beam or projected-beam smoke detectors are used instead of a chamber within the unit: a wall-mounted unit emits a beam of infrared or ultraviolet light which is either received and processed by a separate device, or reflected back to the receiver by a reflector.

In some types, particularly optical beam types, the light emitted by the light source passes through the air being tested and reaches the photosensor. The received light intensity will be reduced by absorption due to smoke, air-borne dust, or other substances; the circuitry detects the light intensity and generates the alarm if it is below a specified threshold, potentially due to smoke. In other types, typically chamber types, the light is not directed at the sensor, which is not illuminated in the absence of particles. If the air in the chamber contains particles (smoke or dust), the light is scattered and some of it reaches the sensor, triggering the alarm.

As stated, ionization detectors are more sensitive to the flaming stage of fires than optical detectors, while optical detectors are more sensitive to fires in the early smoldering stage. Fire safety experts and the National Fire Protection Agency recommend installing what are called combination alarms, which are alarms that either detect both heat and smoke, or use both the ionization and photoelectric processes. Combination alarms that include both technologies in a single device are available, with some even including a carbon monoxide detection capability.

Unfortunately, the size and/or footprint of optical smoke detectors make them impermissible for the vast majority of home use, as well as a large proportion of business use. The inventor of the present disclosure has identified these shortcomings and recognized a need for a more compact, robust optical smoke detector system. That is, an optical smoke detector which is small enough for ubiquitous use while being robust enough for years of long life maintaining a sensitive state.

This overview is intended to provide an overview of subject matter of the present patent application. It is not intended to provide an exclusive or exhaustive explanation of the invention. Further limitations and disadvantages of conventional and traditional approaches will become apparent to one of skill in the art, through comparison of such systems with some aspects of the present invention as set forth in the remainder of the present application with reference to the drawings.

SUMMARY OF THE DISCLOSURE

Device for optically detecting smoke and implementing thereof. Apparatus and methods for detecting the presence of smoke in a small, long-lasting smoke detector are disclosed. Specifically, the present disclosure shows how to build a very compact housing around the smoke detector while keeping the reflections from the housing structure to a very low value while satisfying all the other peripheral needs of fast response to smoke and preventing ambient light. This allows very small measurements of light scattering of the smoke particles to be reliable in a device resistant to the negative effects of dust.

According to one aspect, the present disclosure is an apparatus for identifying smoke using optical analysis techniques described herein. Specifically, the apparatus is disposed in an optical smoke detector and identification is executed thereto.

According to another aspect of the device, light is transmitted through the air through which it is scattered by the smoke particles.

According to another aspect, the scattered light is incident upon a plurality of detectors, each of which are disposed at various distance relative to a light source from the light was transmitted.

According to another aspect, the ratio(s) of detected light is used to determine the presence of smoke.

According to yet another aspect, the apparatus utilizes logic which when executed performs the steps in receiving the light information and making a smoke determination.

According to another aspect, the present disclosure comprises an analog front-end in electrical communication with one or more photodetectors.

According to yet another aspect of the invention, more than one light source is used, each having wavelengths centered at different frequencies.

According to yet another aspect of the invention, each wavelength contributes to the determination of the presence of smoke.

According to yet another aspect of the invention, a plurality of lossy members surrounds the center of the detector chamber.

According to yet another aspect of the invention, the plurality of lossy members is substantially configured to be columns.

According to yet another aspect of the invention, the plurality of lossy members is substantially configured to be wing-like features resembling cooling fins.

According to yet another aspect of the invention, the plurality of lossy members is substantially configured to have index of refraction close to that of household dust.

According to yet another aspect of the invention, the plurality of lossy members also has an imaginary part of the complex impedance which is lossy. This serves not only to mitigate reflections (impedance matching) but absorb power (lossy medium) from ambient light which can give false smoke detector positives.

According to another aspect of the invention, the compact smoke detector can be comprised by an a single analog front-end (AFE).

According to another aspect of the invention, the compact smoke detector and single analog front-end (AFE) can be fabricated from a plurality of dies on a substrate.

According to another aspect of the invention, the compact smoke detector can use one or more optical filters.

According to yet another aspect of the invention, the compact smoke detector can use the one or more optical filters. Specifically, the optical filter can include an absorptive filter and/or interference or dichroic filters.

The drawings show exemplary smoke detector circuits and configurations. Variations of these circuits, for example, changing the positions of, adding, or removing certain elements from the circuits are not beyond the scope of the present invention. The illustrated smoke detectors, configurations, and complementary devices are intended to be complementary to the support found in the detailed description.

BRIEF DESCRIPTION OF THE DRAWINGS

For a fuller understanding of the nature and advantages of the present invention, reference is made to the following detailed description of preferred embodiments and in connection with the accompanying drawings, in which.

DETAILED DESCRIPTION

The present disclosure relates to smoke detection. More specifically, this disclosure describes apparatus and techniques relating to the optically identification of smoke within a compact and robust detector.

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure are set forth in the proceeding in view of the drawings where applicable.

Fires can occur in a variety of ways. The two most common forms of fires are slow smoldering fires and fast flaming fires. A smoldering fire is a slow, low-temperature, flameless form of combustion. These fires develop slowly and generate a significant amount of smoke which is easily detected by an optical smoke detector. Smoldering fires are typically initiated on upholstered furniture by weak heat sources such as cigarettes or an electrical short-circuit.

Fast flaming fires develop rapidly, typically generating black smoke and toxic fumes and leave little time for escape. The characteristic temperature and heat released during smoldering (typically 600° C.) are low compared to those in a fast flaming fire (typically 1500° C.). Fast flaming fires propagate typically about ten times faster than smoldering fires. However, smoldering fires emit a high level of toxic gases such as carbon monoxide. These gases are highly inflammable and could later be ignited in the gas phase, triggering the transition to flaming combustion.

Smoke detectors for detecting smoke through detection of scattered light by smoke particles have conventionally been proposed and put into practice. Such a smoke detector detects a fire as follows. The smoke detector has a dark chamber for storing a photo emitter and a photo detector. Light emitted from the photo emitter is scattered by smoke particles having flowed into the dark chamber, to thus generate scattered light. The photo detector receives the scattered light.

Optical type smoke alarms have several systemic and operational disadvantages when compared with ionization type smoke alarms. In recent years, smoke detectors including light traps for inhibiting noise light (light generated by reflection, by an inner wall of the dark chamber, of light having been emitted from the photo emitter) from reaching the photo detector have been proposed.

There are in general two types of noise light—one caused by unwanted reflections from nearby surfaces of the light emitted from the photo emitter and other ambient light that leaks into the smoke chamber. Both of these lights need to be avoided since there is no way for the photodetector to decide whether light is caused by reflection or from scattering or from the ambient. When such a smoke detector is adopted, one must design the optical and electrical system to avoid false triggering by noise light. The inventors of the present disclosure have recognized how to improve on both fronts while reducing the size, cost, and adding to the aesthetics.

However, in such a smoke detector, the light trap is disposed in front of the photo emitter and the photo detector. Therefore, light emitted from the photo emitter is reflected in a direction parallel to a virtual plane including an optical axis of the photo emitter and that of the photo detector. Accordingly, since noise light is easily incident to a light detecting region, occurrence of a false alarm remains highly possible.

Some smoke detectors employ a labyrinth structure for inhibiting light from entering the dark chamber. Since light emitted from the photo emitter is reflected by edge sections of wall members constituting the labyrinth structure, irregular noise light of an amount that cannot be sufficiently attenuated by the light trap is generated. Therefore, the noise light may enter the light detecting region, to thus cause a false alarm.

In addition, within these type of smoke detectors, a plurality of light traps must be disposed and, a light trap must be disposed inside the labyrinth structure within the dark chamber. Accordingly, either case requires a large space for disposing the light trap, whereby miniaturization of the smoke detector has encountered difficulty. Also, some smoke detectors include another member such as a lens in addition to the light trap, whereby the cost for manufacturing the smoke detector may be increased. Furthermore, the light trap and/or the lens may inhibit smoke from flowing into the dark chamber.

In addition to larger footprint, relative to ionization alarms, optical detection devices suffer from confirmation during the course of their service. Both optical smoke alarms which use an infra-red emitter LED and ionization type smoke alarms are used in the detection of both types of fires and rely upon a flux of ambient air passing through them. In some devices (as in one or more of the foregoing embodiments), fans are employed to facilitate the passage of air through them. However, dust and particulate matter can collect and contaminate some of their device elements. These surfaces become more reflective in all directions so that any light falling on these surfaces can now be scattered into the photodetector in a manner similar to the smoke.

Still, optical detection systems are favored over ionization type systems in certain circumstances. For example, optical systems better detect smoldering fires. Additionally, ionization alarms have the disadvantage that, as they contain radioactive isotopes in their sensors they are subject to regulations concerning their manufacture and disposal. These regulations depend upon the country but can place a considerable burden on the manufacturer.

Optical smoke detectors tend to be large, expensive devices which degrade with age from contamination, giving off false positives. The inventor of the present disclosure has recognized the need for a more robust optical smoke detector, which is on the size order with that of the ubiquitous household ionization unit and is relatively insensitive to the threat of dust and other particulate contamination.

Figure 1A:
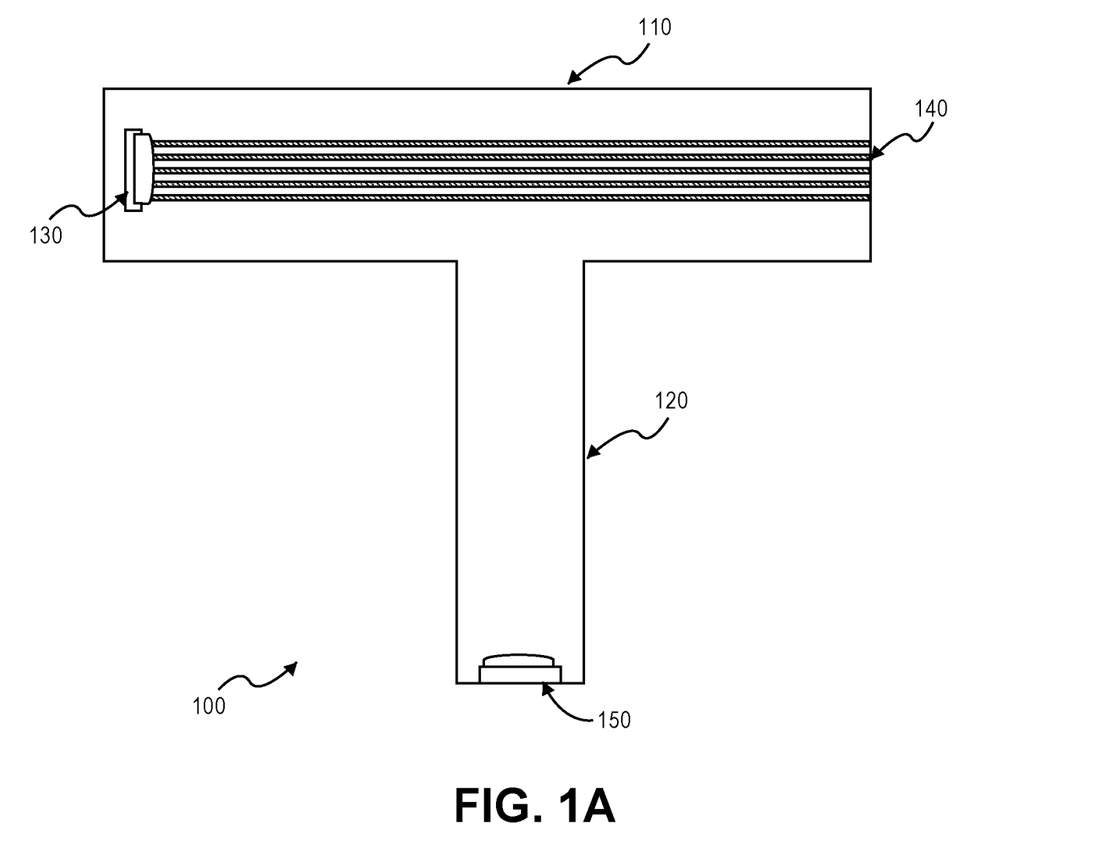
FIG. 1A shows an exemplary optical smoke detector, in accordance with some embodiments of the disclosure provided herein.

FIG. 1A shows an exemplary optical smoke detector 100, in accordance with some embodiments of the disclosure provided herein. Optical smoke detector 100 comprises optical light tube 110, light emitting device 130, optical sensing tube 120, and photodetector 150.

In one or more embodiments, light rays 140 are emitted from light emitting device 130 which propagate down optical light tube 110 during normal, non-emergency operation. Aside from possible ambient leakage, no light travels down optical sensing tube. As can be appreciated by one skilled in the art, photodetector 150 receives nominal light from background but not enough for alarm pursuant to a predetermined threshold. In general, some light from 130 would strike the surfaces of 110 which are often painted black and relatively smooth in order to prevent any scattering down 120 and towards 150. Dust settling on the inner walls of 110 would change this and cause increasing scattering of light towards 150 without the presence of smoke. Smaller the chamber geometry becomes; harder it is to reduce the noise light due to scattering from surfaces. This scattering increases rapidly with dust.

Figure 1B:
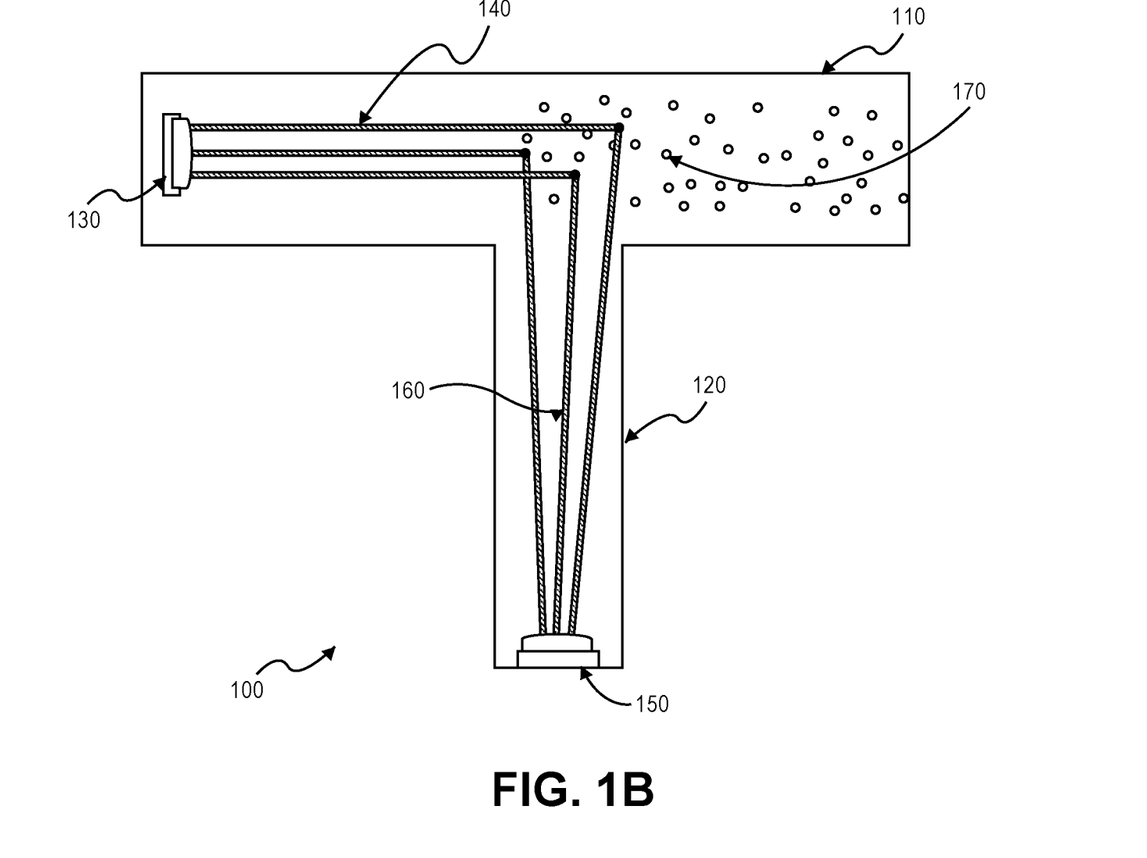
FIG. 1B shows an exemplary optical smoke detector in operation, in accordance with some embodiments of the disclosure provided herein.

FIG. 1B shows an exemplary optical smoke detector 100 in operation, in accordance with some embodiments of the disclosure provided herein. Optical smoke detector 100 comprises optical light tube 110, light emitting device 130, optical sensing tube 120, and photodetector 150.

Operationally, in some embodiments, light rays 140 are emitted from light emitting device 130 which propagate down optical light tube 110. Light rays 140 are incident upon smoke particles 170 and, consequently, get scattered. Scattered light rays 160 propagate down optical sensing tube 120 toward photodetector 150. Photodetector receives nominal light from background in addition to scattered light. Predetermined thresholds, background subtraction and other operational parameters will be discussed in more detail later in the disclosure, which will be appreciated by one skilled in the art.

Figure 2:
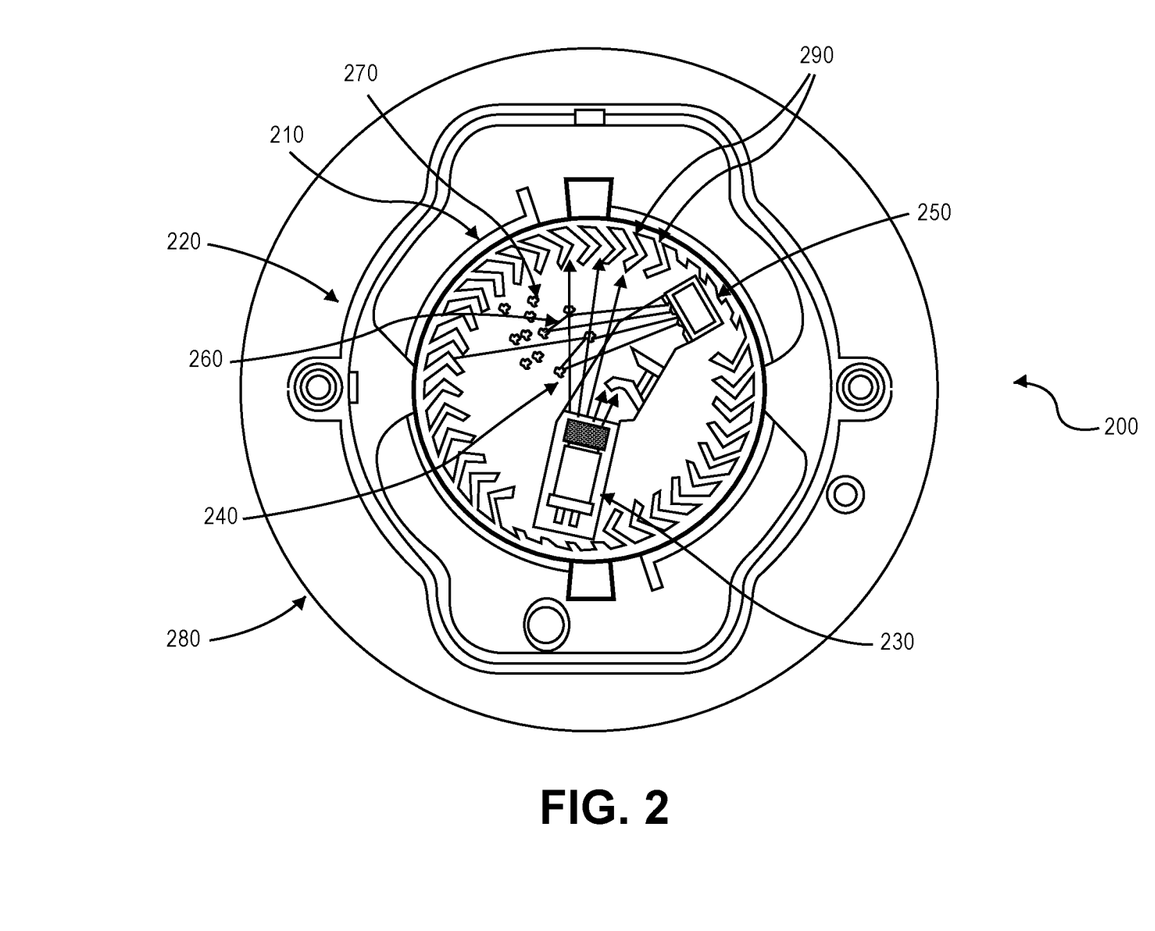
FIG. 2 depicts the top-down view of an exemplary optical smoke detector demonstrative of operation, in accordance with one or more embodiments of the disclosure provided herein.

FIG. 2 depicts the top-down view of an exemplary optical smoke detector 200 demonstrative of operation, in accordance with one or more embodiments of the disclosure provided herein. Optical smoke detector 200 comprises light emitting diode (LED) 230, optical chamber 210, detector cover 220, case molding 280, photodiode/transducer 250 and optical deflection fins 290.

In one or more embodiments, LED 260 is an off-the-shelf green (495 nm-570 nm) light emitting diode. However, any suitable, compact light producing device is not beyond the scope of the present disclosure—whether coherent, incandescent, or even thermal black-body radiation, etc.

Case molding 290 is a substrate in some embodiments providing structure to for attaching detector cover 220 and optical chamber 210 thereto. Typically, it is an object of optical smoke detectors to allow the ingress of smoke from the surrounding air/environment while rejecting the ambient light emanating from same. Generally speaking, detector cover 220 and optical chamber 210 attempt to serve these purposes.

That is, detector cover 220 has two ports (e.g., ingress and egress) for gas/smoke passage, while optical chamber 210 substantially surrounds the detector interior preventing most ambient light to enter. Detector cover 220 and optical chamber 210 are made of an opaque polymer and/or lossy material having a thickness much greater than the average skin depth, according to some embodiments of the present invention. High conductivity (mirrored) or any other suitable material, e.g., metal, semi-metallic, composite, are also not beyond the scope of the present disclosure.

Photodetector 250 is a sensor of light or other electromagnetic energy. Photodetector 250 has p-n junctions that converts light photons into current. The absorbed photons make electron-hole pairs in the depletion region, which is used to detect received light intensity. In some embodiments, photodetector 250 are photodiodes or phototransistors. However, any light detecting means, e.g., avalanche, photo-multiplier tube, etc. is not beyond the scope of the present disclosure.

In operation, light 240 is emitted from LED 260. As can be appreciated by on skilled in art, some of light 240 gets scattered off of smoke particles 270. Scattered light 260 can rescatter or is directed to and therefore detected by photodetector 250. Light 240 which is not scattered by smoke particles 270 are either blocked by a blocking member to prevent direct illumination of photodetector 250 or are incident upon and redirected by optical defector fins 290. Optical deflector fins 290 typically have a black, matt finish whose purpose is to redirect light into other optical deflector fins 290.

Figure 3:
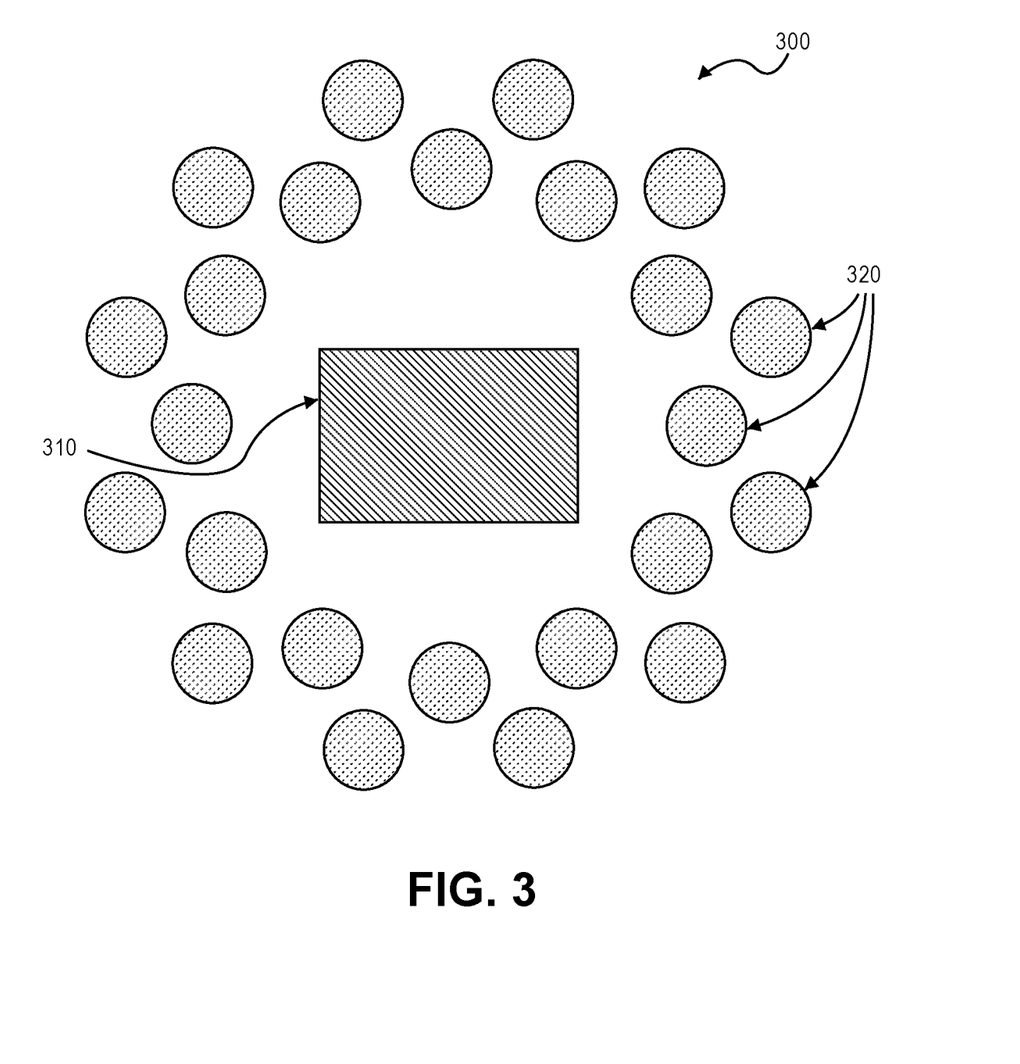
FIG. 3 depicts the top-down view of elements forming an exemplary optical smoke detection device, in accordance with some embodiments of the disclosure provided herein.

FIG. 3 depicts the top-down view of elements forming an exemplary optical smoke detection device 300, in accordance with some embodiments of the disclosure provided herein. In one or more embodiments, substrate 310 comprises an analog front-end (AFE), photodetector, and light source which will be discussed in greater detail later in the disclosure.

In some embodiments, the opto-isolating structural chamber columns 320 are made from a material that absorbs the light in its bulk. Furthermore, the elements are smooth and have mirror like finish instead of matte finish. A bulk absorption material is such that absorption depth >10's of wavelengths of light. Thus, the real part of refractive index remains very close to the same as the non-absorbing material.

In some embodiments, opto-isolating structural chamber columns 320 comprise a polymer or glass. Most plastics and glasses to have index near 1.45-1.6. This can yield a reflectance R~3% from Fresnel equations and smooth surfaces reflect light in a specular fashion, as calculated in the following:

$$R = \frac{1}{2}(R_s + R_p)$$

where, $$R_s = \left|\frac{n_1\cos\theta_i - n_2\cos\theta_t}{n_1\cos\theta_i + n_2\cos\theta_t}\right|^2 = \left|\frac{n_1\cos\theta_i - n_2\sqrt{1-\left(\frac{n_1}{n_2}\sin\theta_i\right)^2}}{n_1\cos\theta_i + n_2\sqrt{1-\left(\frac{n_1}{n_2}\sin\theta_i\right)^2}}\right|^2,$$

and, $$R_p = \left|\frac{n_1\cos\theta_t - n_2\cos\theta_i}{n_1\cos\theta_t + n_2\cos\theta_i}\right|^2 = \left|\frac{n_1\sqrt{1-\left(\frac{n_1}{n_2}\sin\theta_i\right)^2} - n_2\cos\theta_i}{n_1\sqrt{1-\left(\frac{n_1}{n_2}\sin\theta_i\right)^2} + n_2\cos\theta_i}\right|^2.$$

Thus, most of the light incident is absorbed inside the material of the opto-isolating structural chamber columns and even the part that is reflected, very little is back-scattered.

Figure 4A:
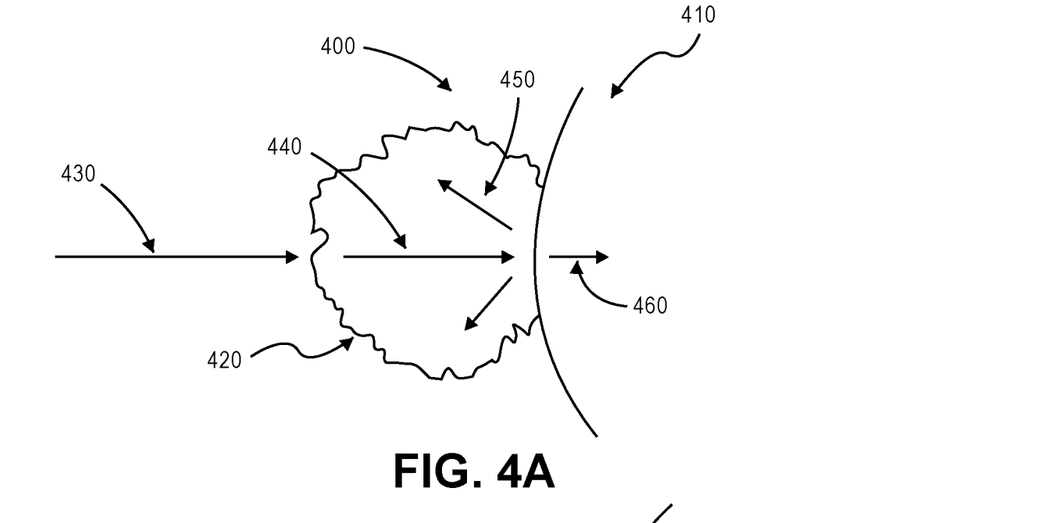
FIG. 4A demonstrates the shortcomings with regard to the state of the art in optical smoke detection devices in operation, in accordance with some embodiments of the disclosure provided herein.

FIG. 4A demonstrates the shortcomings with regard to the state of the art in optical smoke detection devices 400 in operation, in accordance with some embodiments of the disclosure provided herein. Given that smoke detectors are expected to last 10 or more years, it is an object of the present disclosure to present a robust, long-lasting optical smoke detector.

Given the constant air flux throughout a smoke detector, one of ordinary skill will appreciate the debilitating properties of dusk accumulation which will now be discussed in detail with respect to FIGS. 4A and 4B. Dust particle 420 adsorbs to opto-isolating structural chamber columns 410. Incident light ray 430 can be from either ambient, background lighting or from a smoke detector's internal light source. For the purposes of illustration, the present depiction represents a simplification for clarity. That is, we assume light ray 430 is entirely transmitted into dust particle 420.

Incident light ray 430 is transmitted into dust particle 420 becoming light ray 440. When light ray 440 is incident upon opto-isolating structural chamber columns 410, its energy (or vector magnitude) gets decomposed pursuant to Fresnel equations for transmission and reflectance. This is due to an impedance mismatch between the dust and the opto-isolating structural chamber columns 410. Consequently, light ray(s) 450 get reflected and light ray 460 is transmitted into opto-isolating structural chamber columns 410. Additionally, the inventor of the present disclosure notes that light is also scattered if a rough surface, such as matte, is used on opto-isolating structural chamber columns 410, which is also depicted in FIG. 4A.

Figure 4B:
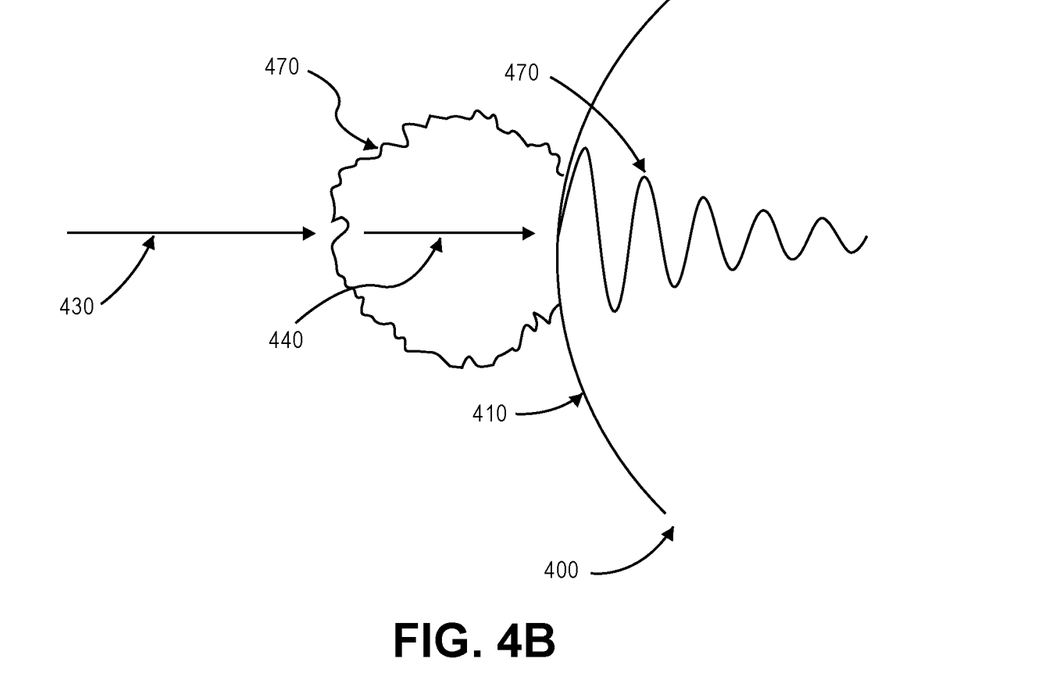
FIG. 4B demonstrates the overcoming of aforementioned shortcomings with regard to the state of the art in optical smoke detection devices in operation and elements comprised by an exemplary optical smoke detector, in accordance with some embodiments of the disclosure provided herein.

FIG. 4B demonstrates the overcoming of aforementioned shortcomings with regard to the state of the art in optical smoke detection devices in operation and elements comprised by an exemplary optical smoke detector 400, in accordance with some embodiments of the disclosure provided herein. Dust particle 420 adsorbs to opto-isolating structural chamber columns 410. Incident light ray 430 can be from either ambient, background lighting or from a smoke detector's internal light source. Again, for the purposes of illustration, the present depiction represents a simplification for clarity. That is, we assume light ray 430 is entirely transmitted into dust particle 420.

Incident light ray 430 is transmitted into dust particle 420 becoming light ray 440. When light ray 440 is incident upon opto-isolating structural chamber columns 410, its energy (or vector magnitude) normally gets decomposed pursuant to Fresnel equations for transmission and reflectance. However, in one or more embodiment of the present disclosure, the real part of the complex impedance (or refractive index) of opto-isolating structural chamber columns 410 is matched to common dust 420. Therefore, light ray 440 is transmitted into opto-isolating structural chamber columns 410 in almost its entirety. Most dust particles have refractive index between 1.35 and 1.55 while most plastics and glass have indices between 1.45 to 1.55.

In one or more embodiments, the imaginary part of the complex impedance of opto-isolating structural chamber columns 410 is chosen such that the material is very lossy, such that, the penetration depth is on the order of tens of wavelengths. If the penetration depth were shorter, than the impedance mismatch becomes large and again the substrate begins to reflect the ray 440. If the absorption depth is too large, then thick members are needed to absorb the light and thus increasing the overall size of the chamber. This is exemplified in the decaying light wave 470 in FIG. 4B. Additionally, the inventor of the present disclosure presents a smooth, specular finish to the surface of opto-isolating structural chamber columns 410 in a preferred embodiment.

Figure 5:
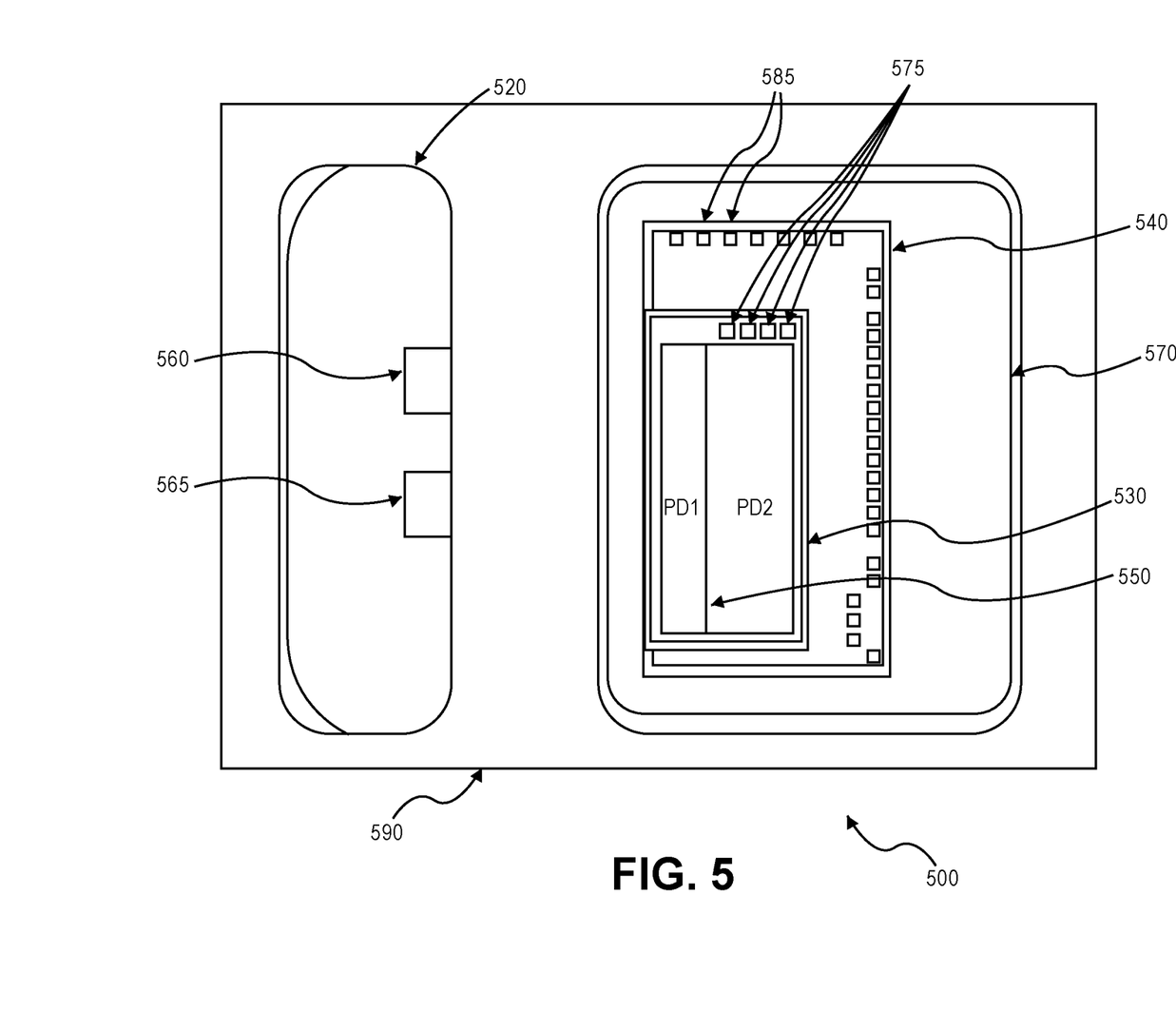
FIG. 5 depicts the top-down perspective of an optical detection die comprised by an exemplary optical smoke detection device, in accordance with some embodiments of the disclosure provided herein.

FIG. 5 depicts the top-down perspective of an optical detection die comprised by an exemplary optical smoke detection device 500, in accordance with some embodiments of the disclosure provided herein. Optical smoke detection device 500 comprises substrate 590, light emitting diodes (LED) 560, 565, LED cover 520, analog front end (AFE) 540, photodetector (PD1) 550, photodetector (PD2) 530, photodetector cover 570, PD pin-out 575, and AFE pin-out 585.

Substrate 590 is a die manufactured from Silicon on Chip (SoC) fabrication processes which are known in the art, however any suitable support structure is not beyond the scope of the present disclosure. For example, substrate 590 can be made from any metal, semi-metallic, semiconductor, mixture/compound or polymer, provided caution is taken to ensure the AFE 540 is not shorted.

Light blocking members run along the perimeter of the upper substrate 590. Their function is to block ambient light from being received by photodetectors 530, 550. As such, ambient light blocking members are made from an opaque polymer and/or lossy material having a thickness much greater than the average skin depth, according to some embodiments of the present invention. High conductivity (mirrored) are also not beyond the scope of the present disclosure.

Similarly, opto-isolator traverses the entire span between the LEDs 560, 565 side and the photodetectors 530, 550 side of the device, which will be explained in greater detail later in the disclosure. The function of the opto-isolator is to block LEDs 560, 565 light from being directly received by photodetectors 530, 550. As such, opto-isolator is made from an opaque polymer and/or lossy material having a thickness much greater than the average skin depth, according to some embodiments of the present invention. High conductivity (mirrored) are also not beyond the scope of the present disclosure, however, this is not a preferred embodiment as will be clear later in the disclosure.

Photodetector cover 570 and LED cover 520 are transparent polymer protective encasements of photodetectors 530, 550 and LEDs 560, 565, respectively. In other embodiments, photodetector cover 570 and LED covers are crystalline (glass, Pyrex, etc.), although any suitable can be used.

In one or more embodiments, LEDs 560, 565 are an off-the-shelf red and near-infrared (450 nm-1400 nm) light emitting diode. However, any suitable, compact light producing device of any color is not beyond the scope of the present disclosure. In some embodiments where LEDs, 560, 565 emit different wavelengths, photodetector (PD1) 550 and photodetector (PD2) 530 can be modified to accommodate the detection thereof. For example, half of photodetector (PD1) 550 and photodetector (PD2) 530 can be covered with different optical filters.

In particular, photodetector (PD1) 550 and photodetector (PD2) 530 can be covered with dichroic filters, at least in part. A dichroic filter, thin-film filter, or interference filter is a very accurate color filter used to selectively pass light of a small range of colors while reflecting other colors. By comparison, dichroic mirrors and dichroic reflectors tend to be characterized by the color(s) of light that they reflect, rather than the color(s) they pass.

While dichroic filters are used in the present embodiment, other optical filters are not beyond the scope of the present invention, such as, interference, absorption, diffraction, grating, Fabry-Perot, etc. An interference filter consists of multiple thin layers of dielectric material having different refractive indices. There also may be metallic layers. In its broadest meaning, interference filters comprise also etalons that could be implemented as tunable interference filters. Interference filters are wavelength-selective by virtue of the interference effects that take place between the incident and reflected waves at the thin-film boundaries.

In other embodiments, a plurality of detectors is implemented, e.g., at least two for wavelength such that each of the pair of the plurality is wavelength specific. For example, there are at least two detectors (PD1, PD2) for every light emitting diode for a particular lambda.

Analog front-end 540 (AFE) is a set of analog signal conditioning circuitry that uses sensitive analog amplifiers., operational amplifiers, filters, and application-specific integrated circuits as needed to interface with sensors to analog to digital converter and/or microcontroller.

AFE 540 is in electrical communication with photodetectors 530, 550 through PD pin-outs 575. PD pin-outs 575 electrically communicate with photodetectors 530, 550 through traces. In the present embodiment, photodetectors 530, 550 and AFE 540 are packed as dies with soldered pin-outs. However, in other embodiments, they are integrated at the wafer level communicating through traces and vertical interconnect access (VIA) or through silicon VIA (TSV).

In some embodiments, AFE pin-out 585 is electrical communication with pulse oximeter 100. In other embodiments, AFE pin-out 585 can be in electrical communication with a microcontroller unit (MCU), field programmable gate array (FPGA), bus, or other computer platform, such as, Arduino or Raspberry Pi, etc.—all of which are not beyond the scope of the present disclosure.

Figure 6:
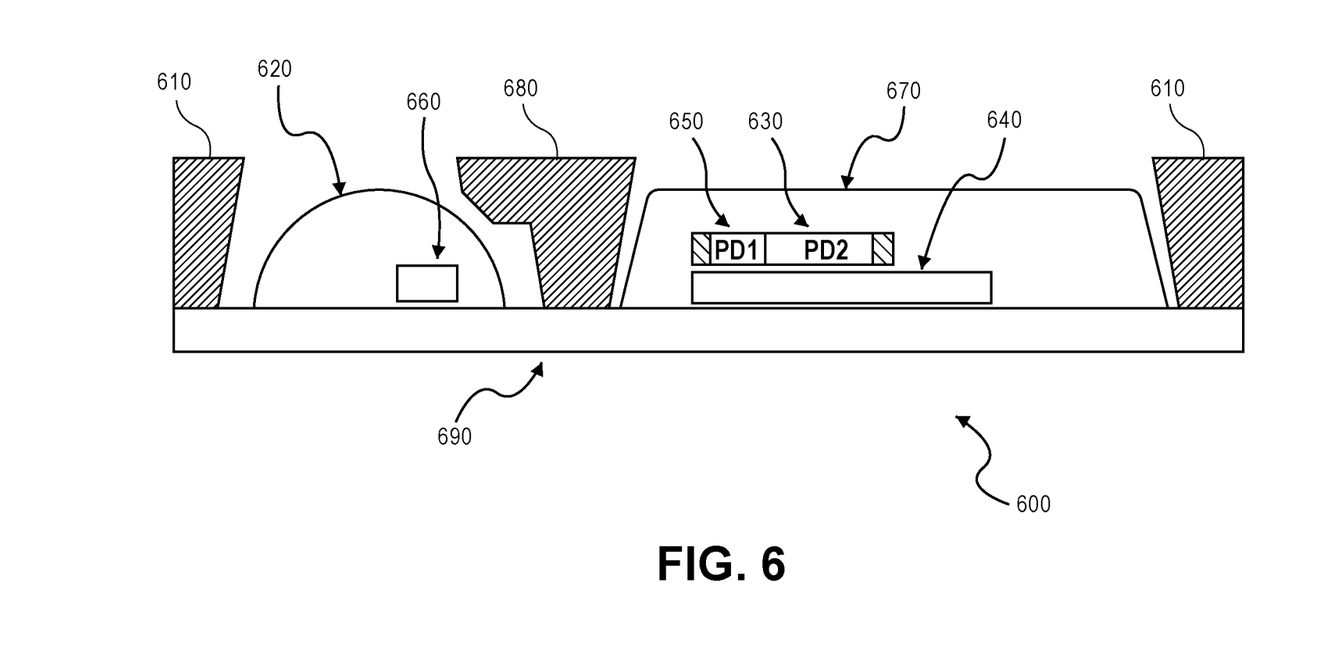
FIG. 6 depicts the side view of an optical detection die comprised by an exemplary optical smoke detection device, in accordance with some embodiments of the disclosure provided herein.

FIG. 6 depicts the side view of an optical detection die 600 comprised by an exemplary optical smoke detection device, in accordance with some embodiments of the disclosure provided herein. Optical detection die 600 comprises ambient light blocking members 610, opto-isolator 680, substrate 690, light emitting diode (LED) 660, LED cover 620, analog front end (AFE) 640, photodetector (PD1) 650, photodetector (PD2) 630, and photodetector cover 670.

In one or more embodiments, substrate 690 is a die manufactured from Silicon on Chip (SoC) fabrication processes which are known in the art, however any suitable support structure is not beyond the scope of the present disclosure. For example, substrate 690 can be made from any metal, semi-metallic, semiconductor, mixture/compound or polymer, provided caution is taken to ensure the AFE 640 is not shorted.

Ambient light blocking members 610 run along the perimeter of the upper substrate 690. Their function is to block ambient light from being received by photodetectors 630, 650. As such, ambient light blocking members 610 are made from an opaque polymer and/or lossy material having a thickness much greater than the average skin depth, according to some embodiments of the present invention. High conductivity (mirrored) are also not beyond the scope of the present disclosure.

Similarly, opto-isolator 680 traverses the entire span between the LED 660 side and the photodetectors 630, 650 side of the device, which will be explained in greater detail later in the disclosure. The function of the opto-isolator 680 is to block LED 660 light from being directly received by photodetectors 630, 650. As such, opto-isolator 680 are made from an opaque polymer and/or lossy material having a thickness much greater than the average skin depth, according to some embodiments of the present invention. High conductivity (mirrored) are also not beyond the scope of the present disclosure, however, this is not a preferred embodiment as will be clear later in the disclosure.

In one or more embodiments, LED 660 is an off-the-shelf green (495 nm-570 nm) light emitting diode. However, any suitable, compact light producing device is not beyond the scope of the present disclosure—whether coherent, incandescent, or even thermal black-body radiation, etc. LED cover 630 is a transparent polymer protective encasement of LED 260. In other embodiments, LED cover 630 is crystalline (glass, Pyrex, etc.), although any suitable can be used. While translucent and/or lossy materials may be used within the scope of the present disclosure, these are not preferred embodiments, which will be made more apparent later in the disclosure.

Photodetectors 650, 630 (PD1, PD2, respectively) are sensors of light or other electromagnetic energy. Photodetector 630, 650 have p-n junctions that converts light photons into current. The absorbed photons make electron-hole pairs in the depletion region, which is used to detect received light intensity. In some embodiments, photodetectors 650, 630 are photodiodes or phototransistors. However, any light detecting means, e.g., avalanche, photo-multiplier tube, etc. is not beyond the scope of the present disclosure.

Analog front-end 640 (AFE or analog front-end controller AFEC) is a set of analog signal conditioning circuitry that uses sensitive analog amplifiers, often operational amplifiers, filters, and sometimes application-specific integrated circuits for sensors, radio receivers, and other circuits to provide a configurable and flexible electronics functional block, needed to interface a variety of sensors to an, antenna, analog to digital converter or in some cases to a microcontroller. AFE 640 is in electrical communication with photodetectors 650, 630 and optical smoke detector.

Photodetector cover 670 is a transparent polymer protective encasement of PD1 and PD2. In other embodiments, photodetector cover 670 is crystalline (glass, Pyrex, etc.), although any suitable can be used. While translucent and/or lossy materials may be used within the scope of the present disclosure.

Figure 7:
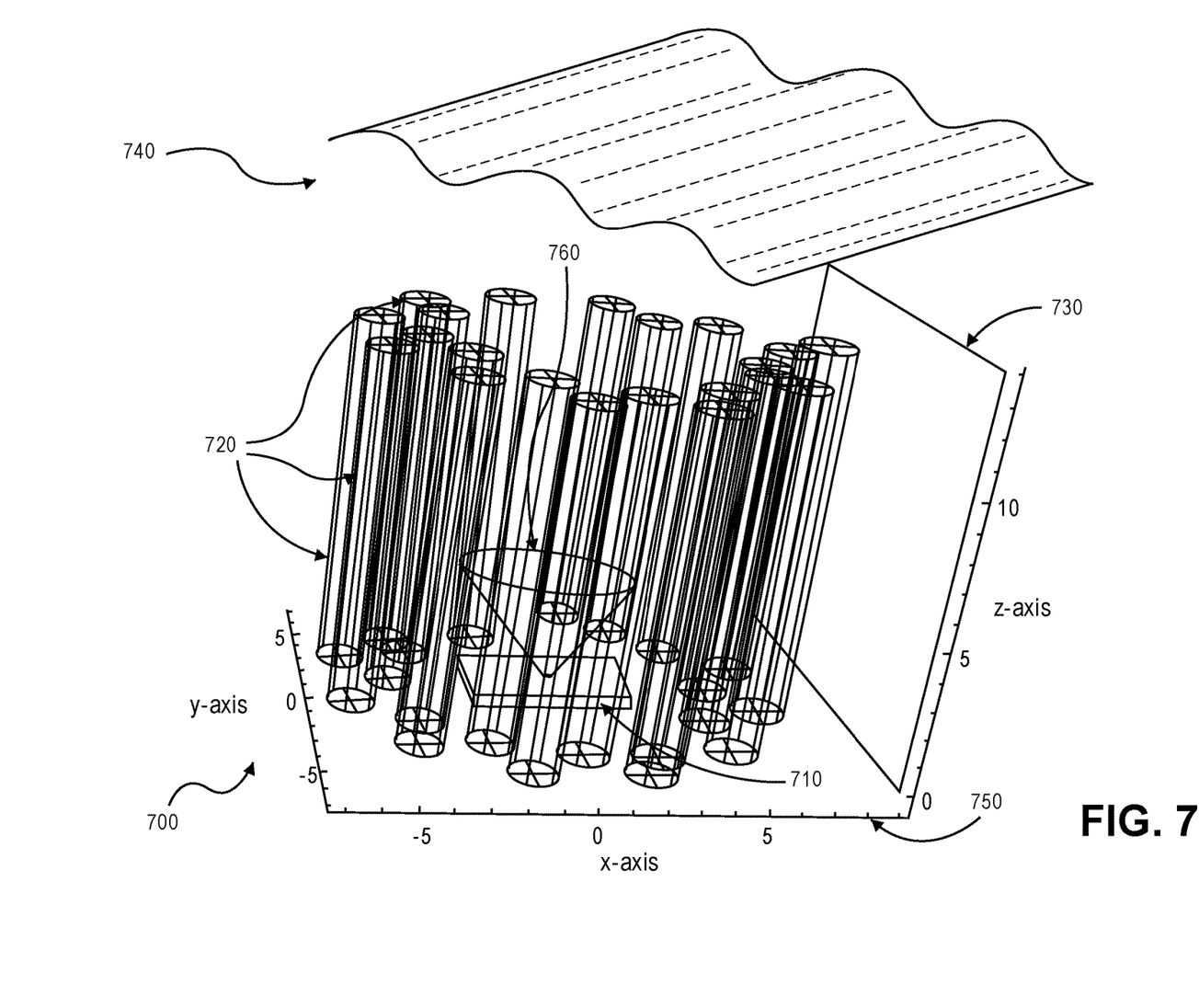
FIG. 7 graphically illustrates an isometric view of an exemplary optical smoke detection device in operation, in accordance with some embodiments of the disclosure provided herein; and, FIG. 8 depicts the top-down view of elements forming an exemplary optical smoke detection device, in accordance with some embodiments of the disclosure provided herein.

FIG. 7 graphically illustrates an isometric view of an exemplary optical smoke detection device 700 in operation, in accordance with some embodiments of the disclosure provided herein. The inventors of the present disclosure have built one of the smallest smoke detectors 700 which only needs a very small chamber around the detector to protect it from insects, ambient light, and large particulate matter.

Heretofore in the art, large housings are used to prevent light scattering from dust build-up over time. Light scattered from the housing elements can prevent detection of small changes in light scattering from the smoke particles hindering the performance of these sensor systems. Thus, housing or chamber design plays acritical role. It must also allow for easy exchange of smoke from the surroundings and thus have fairly large openings.

This disclosure shows how to build a very compact housing around the smoke detector while keeping the reflections from the housing structure to a very low value while satisfying all the other peripheral needs of fast response to smoke and preventing ambient light. This allows very small measurements of light scattering of the smoke particles to be reliable.

Optical smoke detection device 700 comprises base 750, die substrate 710, side enclosure 730, opto-isolating structural chamber columns 720, and upper reflecting surface 740. In one or more embodiments, base 750 which may consist of PCB or ways to carry all the electronics and provide means of attachment, opto-isolating structural chamber columns 720 and die substrate 710 are in accordance with those described in association with FIGS. 2, 3, 5, and 6. Side enclosure 730 can serve two purposes. That is, side enclosure 730 block the entrance of ambient while directing air through the optical smoke detection device 700 passage.

Upper reflecting surface 740 is constructed similar to the side structures and uses the same design idea. That the light incident from the photo emitter directly impinging on this surface should be minimally reflected/scattered back from the surface of this structure. This is achieved using a highly corrugated or curved surface so that no direct reflection from this surface is directed towards the photo detector elements. The light is reflected towards other surfaces in the chamber. As described earlier for FIG. 4b, the light incident on the surface is mostly absorbed in the bulk of the material. A small amount of roughly 3% that is reflected is directed towards another surface either on the upper reflecting or any of the side surfaces, where the process repeats. Thus, very small amount of light is returned to the photodetector.

It is noted that upper reflecting surface may be anti-reflection coated for better absorption in the bulk but in practice it may not be necessary. This is because, the light may be incident from many angles to the surface especially if the top reflecting surface is corrugated or curved in a complex fashion. Also, after collection of dust on the surface, the surface may not act like anti-reflective.

In operation, light ray from light cone 760 are directed in an upward manner. Rays that do return to the detector have bounced many times from the various members and have lost most of the energy. Ray trace shows how the rays have very low probability of returning to the detector.

Opto-isolating structural chamber columns 720, 740 comprise absorbing rods of plastic. For example, opto-isolating structural chamber columns 720 comprise acrylic, PMMA, polycarbonate, etc. However, any suitable material can be used, e.g., with a properly match index of refraction and complex impedance.

The design shown in FIG. 7 allows one to measure the light scattered off the smoke particles back towards the photodetector while the optical structures are designed to reduce noise light to a very low level. Furthermore, these optical structures can be placed very close to each other and to the light generation and detection apparatus making for a very compact structure. This structure reduces (1) noise light from the light emitter, (2) noise light from the ambient, and (3) provides for a compact measurement with a single module such as those shown in FIGS. 5 and 6.

Figure 8:
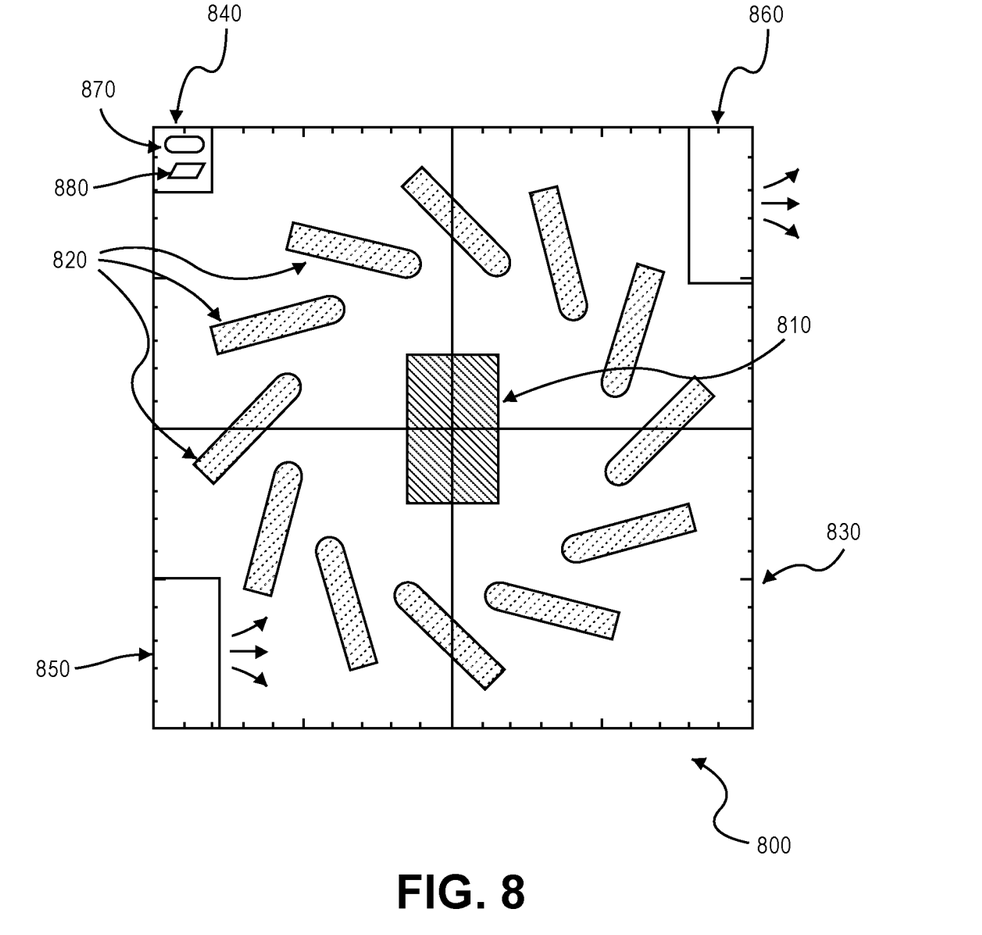

FIG. 8 depicts the top-down view of another design of elements forming an exemplary optical smoke detection device 800, in accordance with some embodiments of the disclosure provided herein. In one or more embodiments, substrate 810 comprises an analog front-end (AFE), photodetector, and light source in accordance with the previous embodiments. Furthermore, similar upper reflecting structures such as 740 can be used.

Optical smoke detection device 800 comprises ingress port 850, egress port 860 and ionization smoke detector 840, according to some embodiments. Ports 850, 860 allow for an air path to travel through optical smoke detection device 800. In alternate embodiments ingress port 850 and egress port 860 comprise small low power fans to facilitate this passing of gas.

An ionization smoke detector 840 uses a radioisotope, typically americium-241, to ionize air; a difference due to smoke is detected and an alarm is generated. Ionization detectors are more sensitive to the flaming stage of fires than optical detectors, while optical detectors are more sensitive to fires in the early smoldering stage.

The smoke detector has two ionization chambers 840, 880, one open to the air (840), and a reference chamber (880) which does not allow the entry of particles. The radioactive source emits alpha particles into both chambers, which ionizes some air molecules. There is a potential difference (voltage) between pairs of electrodes in the chambers; the electrical charge on the ions allows an electric current to flow.

The currents in both chambers should be the same as they are equally affected by air pressure, temperature, and the ageing of the source. If any smoke particles enter the open chamber, some of the ions will attach to the particles and not be available to carry the current in that chamber. An electronic circuit detects that a current difference has developed between the open and sealed chambers, and sounds the alarm.

In some embodiments, the opto-isolating structural chamber deflectors 820 are made from a material that absorbs the light in its bulk. Furthermore, the elements are smooth and have mirror like finish instead of matte finish. A bulk absorption material is such that absorption depth >10's of wavelengths of light. Thus, the real part of refractive index remains very close to the same as the non-absorbing material.

In some embodiments, opto-isolating structural chamber deflectors 820 substantially comprise three-dimensional orthotopes, right rectangular prisms, rectangular cuboids, or rectangular parallelepipeds. In one more embodiments, opto-isolating structural chamber deflectors 820 are substantially rounded on one surface or may have knife edge. Note that this applies to the upper reflecting surface 740 too. The purpose of opto-isolating structural chamber deflectors 820 is to direct reflected light into another opto-isolating structural chamber deflectors 820, which can be appreciated by one of ordinary skill in the art. Thus, most of the light incident is absorbed inside the material and even the part that is reflected, very little is back-scattered.

Most dust particles have index of glass and are between 1.4-1.7. Opto-isolating structural chamber deflectors 820 are index matched and produce lower scattering compared to the same particle attached to a surface of a very different refractive index. All forward scattering from these particles is also absorbed by their substrate. Again, this leads to very low back-scattering from the dust build-up over time.

Members of the chamber, i.e., opto-isolating structural chamber deflectors 820, are aligned to reflect light away from the source and towards other members of the chamber. Thus, the light is extinguished extremely rapidly. After n reflections, the reflected light is reduced to $R^n$ and is rapidly removed. This makes for very compact design: less than a 1 cm in radius from the center where the smoke sensor is and <1 cm in height.

The present disclosure gives rise to a total attenuation from the LED to the detector of the order of $10^{-6}$. This has been achieved by design in simulations and by construction.

The inventors of the present disclosure also exploit the notion these scattering characteristics can be wavelength dependent. Thus, an analysis and/or comparison of different wavelength, lambdas, and/or ratio of PD1/PD2 maybe wavelength dependent and useful in detection of numerous particulate matter.

Other means, systems and devices are not beyond the scope of the present invention. For example, a plurality of 3 or more photodetectors could be used to further interpolate and extrapolate characteristic signals of materials. Additionally, alternate LED/photodetector dispositions and geometries can be used.

In reference to the scattering theory of light, the inventors' observations and models closely conform, is consistent with and reflect this well-known theory, known to those in the art. As such, the observations that follow stem from an underlying physics and thus more general than any particular device enumerated in several of the embodiments.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments may be implemented in any of numerous ways. One or more aspects and embodiments of the present application involving the performance of processes or methods may utilize program instructions executable by a device (e.g., a computer, a processor, or other device) to perform, or control performance of, the processes or methods.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above.

The computer readable medium or media may be transportable, such that the program or programs stored thereon may be loaded onto one or more different computers or other processors to implement various ones of the aspects described above. In some embodiments, computer readable media may be non-transitory media.

The terms "program" or "software" are used herein in a generic sense to refer to any type of computer code or set of computer-executable instructions that may be employed to program a computer or other processor to implement various aspects as described above. Additionally, it should be appreciated that according to one aspect, one or more computer programs that when executed perform methods of the present application need not reside on a single computer or processor, but may be distributed in a modular fashion among a number of different computers or processors to implement various aspects of the present application.

Computer-executable instructions may be in many forms, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a personal digital assistant (PDA), a smart phone, a mobile phone, an iPad, or any other suitable portable or fixed electronic device.

Also, a computer may have one or more input and output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined.

Elements other than those specifically identified by the "and/or" clause may optionally be present, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the term "between" is to be inclusive unless indicated otherwise. For example, "between A and B" includes A and B unless indicated otherwise.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The present invention should therefore not be considered limited to the particular embodiments described above. Various modifications, equivalent processes, as well as numerous structures to which the present invention may be applicable, will be readily apparent to those skilled in the art to which the present invention is directed upon review of the present disclosure.

The present invention should therefore not be considered limited to the particular embodiments described above. Various modifications, equivalent processes, as well as numerous structures to which the present invention may be applicable, will be readily apparent to those skilled in the art to which the present invention is directed upon review of the present disclosure.

What is claimed is:

1. An apparatus for detecting smoke within a compact footprint detector which mitigates deleterious effects of dust, thereby increasing longevity and efficacy, the apparatus comprising:
    a first light source, the first light source producing light centered about a first wavelength, $\lambda_1$;
    a first photodetector disposed substantially proximal to the first light source;
    an analog front-end packaged as a die with soldered pinouts configured to: receive a first signal from the first photodetector; and, determine the presence of smoke at least based on the first received signal; and
    a plurality of lossy optical members having a refractive index between 1.4-1.7; wherein the plurality of lossy optical members are positioned relative to the first light source to dissipate electrical or electromagnetic energy centered about the first wavelength, $\lambda_1$, from the first light source and the first photodetector is disposed on the analog front-end.

2. The apparatus of claim 1, wherein the first light source comprises a first light emitting diode (LED) having a spectral intensity centered about the first wavelength, $\lambda_1$.

3. The apparatus of claim 2 further comprising a second light emitting diode have a spectral intensity centered about a second wavelength, $\lambda_2$.

4. The apparatus of claim 3 further comprising a second photodetector having a spectral intensity centered about the second wavelength, $\lambda_2$.

5. The apparatus of claim 1, further comprising a substantially opaque barrier between the first light source and the first photodetector.

6. The apparatus of claim 1, further comprising a substrate.

7. The apparatus of claim 6, wherein the first light source is disposed on the substrate.

8. The apparatus of claim 1, wherein the received first signal is based on scattering and is correlated to an amount of particulate matter present in the apparatus.

9. The apparatus of claim 1, wherein the plurality of lossy optical members comprise an anti-reflective coating.

10. The apparatus of claim 1, wherein the plurality of lossy optical members are substantially shaped like wings.

11. The apparatus of claim 1, wherein the plurality of lossy optical members are substantially shaped like columns.

12. The apparatus of claim 1, wherein the plurality of lossy optical members are substantially shaped like fins.

* * * * *